(12) United States Patent
Yamada et al.

(10) Patent No.: US 10,064,205 B2
(45) Date of Patent: Aug. 28, 2018

(54) TRANSMISSION MODULE, INFORMATION TRANSMISSION NETWORK SYSTEM, INFORMATION TRANSMISSION METHOD, AND INFORMATION TRANSMISSION PROGRAM

(71) Applicant: OMRON Corporation, Kyoto-shi, Kyoto (JP)

(72) Inventors: Ryota Yamada, Kyoto (JP); Yusuke Yamaji, Nara (JP); Hajime Umeki, Kyoto (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 15/037,006

(22) PCT Filed: Oct. 30, 2014

(86) PCT No.: PCT/JP2014/078940
§ 371 (c)(1),
(2) Date: May 16, 2016

(87) PCT Pub. No.: WO2015/072343
PCT Pub. Date: May 21, 2015

(65) Prior Publication Data
US 2016/0278109 A1 Sep. 22, 2016

(30) Foreign Application Priority Data
Nov. 15, 2013 (JP) .................. 2013-236498

(51) Int. Cl.
*H04W 72/10* (2009.01)
*H04W 4/70* (2018.01)
(Continued)

(52) U.S. Cl.
CPC ............. *H04W 72/10* (2013.01); *H04B 7/15* (2013.01); *H04L 47/624* (2013.01);
(Continued)

(58) Field of Classification Search
None
See application file for complete search history.

(56) References Cited

U.S. PATENT DOCUMENTS

2007/0159321 A1 7/2007 Ogata et al.
2007/0185646 A1* 8/2007 Neugebauer ........... G08C 17/02
701/533
(Continued)

FOREIGN PATENT DOCUMENTS

JP 2006-287385 A 10/2006
JP 2007-184754 A 7/2007
(Continued)

OTHER PUBLICATIONS

International Preliminary Report on Patentability issued in corresponding Application No. PCT/JP2014/078940, dated May 26, 2016 (9 pages).
(Continued)

*Primary Examiner* — Alex Skripnikov
*Assistant Examiner* — Pamit Kaur
(74) *Attorney, Agent, or Firm* — Osha Liang LLP

(57) ABSTRACT

A transmission module is provided as a relay, which is capable of transmitting information smoothly and suppressing the power consumption required for the information transmission. In a transmission module that transmits specific transmission information along a predetermined transmission path including an information processing device, the specific transmission information is stored in a memory of a subject transmission module in a manner where a plurality of pieces of specific information included in the specific transmission information are arranged, with a storage location of the specific transmission information being associated with a priority level set by a priority level setting unit. A portion of the plurality of pieces of specific information is extracted in accordance with the storage location,
(Continued)

based on a result of transmission to a downstream transmission module to form new specific transmission information to be transmitted to the downstream transmission module, and the new specific transmission information is transmitted to the downstream transmission module.

14 Claims, 9 Drawing Sheets

(51) Int. Cl.
*H04L 12/863* (2013.01)
*H04B 7/15* (2006.01)
*H04W 4/00* (2018.01)
*H04W 28/06* (2009.01)

(52) U.S. Cl.
CPC ............ *H04W 4/005* (2013.01); *H04W 4/70* (2018.02); *H04W 28/065* (2013.01)

(56) References Cited

U.S. PATENT DOCUMENTS

| | | | |
|---|---|---|---|
| 2008/0192661 A1* | 8/2008 | Hamamoto | H04L 1/1887 370/310 |
| 2009/0046739 A1 | 2/2009 | Ebling et al. | |
| 2011/0176478 A1 | 7/2011 | Inohiza | |
| 2012/0155301 A1 | 6/2012 | Miyazaki et al. | |

FOREIGN PATENT DOCUMENTS

| | | |
|---|---|---|
| JP | 2009124307 A | 6/2009 |
| JP | 2010-022049 A | 1/2010 |
| JP | 2010-093758 A | 4/2010 |
| JP | 2012-129805 A | 7/2012 |

OTHER PUBLICATIONS

International Search Report issued in PCT/JP2014/078940 dated Jan. 27, 2015 (2 pages).
Written Opinion of the International Searching Authority issued in PCT/JP2014/078940 dated Jan. 27, 2015 (5 pages).
Extended European Search Report issued in counterpart European Patent Application No. 14862173.3, dated May 31, 2017 (9 pages).

* cited by examiner

FIG. 5A

| Start Symbol 4 Byte | Legth of Destination Address 1 Byte | Destination Address 0 – 255 Byte | Length of Source Address 1 Byte | Source Address 0 – 255 Byte | Length of Data 2 Byte | Data 0-65535 Byte | Terminator Symbol for Data 4 Byte |
|---|---|---|---|---|---|---|---|
| a1 | a2 | | a3 | | | a4 | a5 |

FIG. 5B

| | DATA TYPE | DATA ACQUISITION TIME | DATA VALUE |
|---|---|---|---|
| DATA 1 | TEMPERATURE DATA | t10 | T1 |
| DATA 2 | ACCELERATION DATA | t10 | A1 |
| DATA 3 | TEMPERATURE DATA | t20 | T2 |
| DATA 4 | ACCELERATION DATA | t20 | A2 |
| DATA 5 | TEMPERATURE DATA | t30 | T3 |
| DATA 6 | ACCELERATION DATA | t30 | A3 |

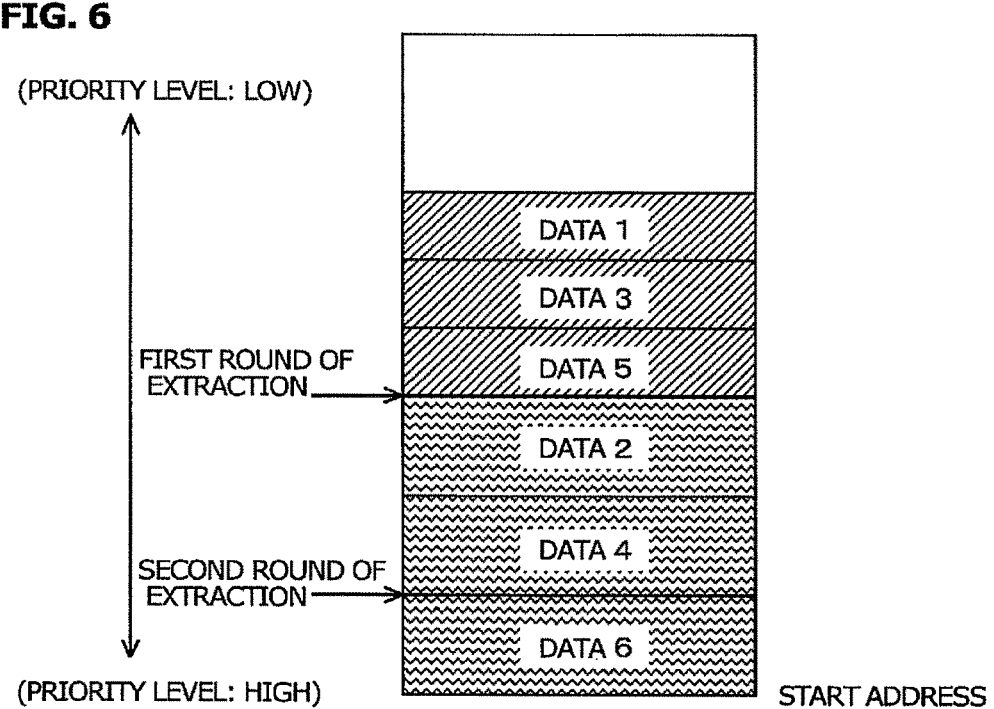

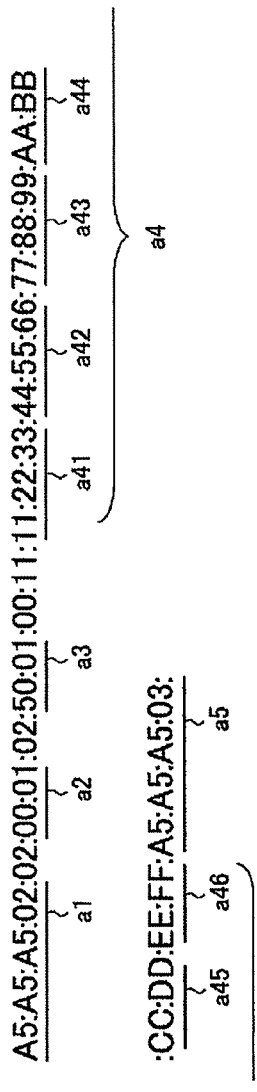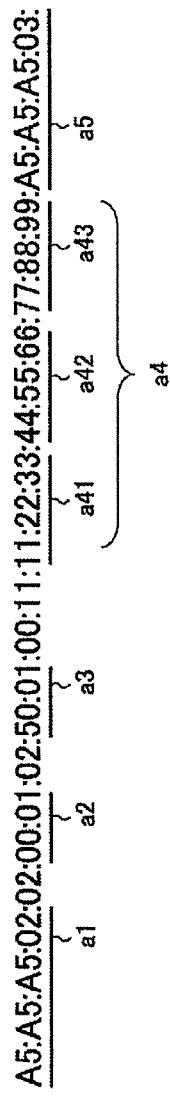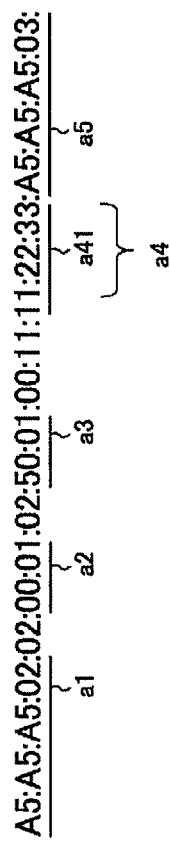

TRANSMISSION MODULE, INFORMATION TRANSMISSION NETWORK SYSTEM, INFORMATION TRANSMISSION METHOD, AND INFORMATION TRANSMISSION PROGRAM

TECHNICAL FIELD

The present invention relates to a transmission module that transmits information related to an information processing device along a predetermined transmission path including the information processing device, and a network system that includes the transmission module and the information processing device.

BACKGROUND ART

Conventionally, a technique of transmitting information measured by a sensor module that measures environmental parameters such as temperature and humidity to an information processing device via a network to thereby collect many pieces of measurement data easily has been developed. In this case, a wireless function is provided to the sensor module to form a wireless network for transmitting the measured information. For example, Patent Literature 1 discloses a technique related to a wireless network for transmission of data between a base station and a cellular phone terminal. In this technique, when a data retransmission request is received due to deterioration in the communication performance, data is divided into smaller data to improve the success rate of data transmission. In particular, the success rate is improved by dividing data such that the worse the communication quality (the severer the degree of deterioration in the communication performance), the smaller becomes the divided data.

Moreover, for example, Patent Literature 2 discloses a technique related to transmission of data between a sensor terminal and a relay. In this technique, the ratio between the measurement data measured by the sensor, included in data to be transmitted and the data (for example, RSSI, the number of retransmissions, latency, or the like) related to the communication quality is adjusted according to the degree of deterioration in the communication performance. In this way, both the measurement data necessary for a network and the data necessary for maintaining the communication quality of the network are collected. In this technique, the ratio is adjusted by allocating an increased data volume created by removing some measurement data to the data related to the communication quality.

CITATION LIST

Patent Literature

[PTL1] Japanese Patent Application Publication No. 2010-22049
[PTL2] Japanese Patent Application Publication No. 2012-129805

SUMMARY OF INVENTION

Technical Problem

In a network that transmits information to a destination via a plurality of relays, it is preferable to transmit information as much as possible from the perspective of information collection. However, when the volume of information to be transmitted increases and particularly when the information is transmitted by wireless communication, information transmission may sometimes not be performed satisfactorily due to external causes such as external noise. When transmission fails like this, even when the information is retransmitted, if the volume of transmission information is still large, a condition in which it is difficult to realize smooth information transmission continues unless the transmission environment is improved.

Moreover, some relays that forma network may not always be supplied with unlimited electric power due to reasons such as their locations. Such relays perform an information transmission process using electric power stored in their internal battery. However, it is necessary to suppress the power consumption required for the information transmission process so that the process can be continued as long as possible. On the other hand, in the case of relays which are supplied with unlimited electric power, it is also undesirable to consume a large amount of electric power required for the information transmission process and it is generally necessary to suppress the power consumption.

With the foregoing in view, it is an object of the present invention to provide a transmission module as a relay capable of transmitting information smoothly and suppressing the power consumption required for the information transmission.

Solution to Problem

In the present invention, in order to solve the problems, a configuration in which a transmission module that transmits information (hereinafter referred to as "specific transmission information") to be processed by an information processing device extracts a portion of the specific transmission information according to a predetermined priority level based on the result of transmission of information to a transmission module on a downstream side thereof and transmits the extracted specific transmission information is employed. Due to this, it is possible to suppress the volume of the information to be transmitted and to obtain appropriate transmission results. Moreover, a configuration in which in order to suppress the power consumption required for the extraction process, a storage unit stores the specific transmission information in a memory according to a predetermined transmission priority level is employed. In the present specification, a "subject transmission module" is an expression used for specifying a transmission module included in a network. That is, when one transmission module belonging to a network is taken as a reference, the transmission module is expressed as the "subject transmission module" to specify the transmission module itself. Moreover, when the subject transmission module is taken as a reference, a transmission module located on the upstream side in relation to the flow of information in a network is expressed as an "upstream transmission module" or a similar expression, and a transmission module located on the downstream side is expressed as a "downstream transmission module" or a similar expression. Thus, the expressions such as "subject transmission module", "upstream transmission module," and "downstream transmission module" are based on a relative relation between transmission modules. Thus, if a different transmission module is taken as a reference, a different transmission module is naturally specified as the subject transmission module. Moreover, when it is not necessary to distinguish between "subject transmission module," "upstream transmission module", "downstream transmission module," and the like, these transmission modules will be expressed as "transmission modules" only.

Specifically, the present invention is directed to a transmission module that transmits specific transmission information to be processed by an information processing device along a predetermined transmission path including the information processing device. The transmission module includes: a receiving unit that receives information from an upstream transmission module located on an upstream side of a subject transmission module in the predetermined transmission path; a priority level setting unit that sets a priority level in transmission to a downstream transmission module located on a downstream side of the subject transmission module in the predetermined transmission path, for a plurality of pieces of specific information included in the specific transmission information received by the receiving unit; a storage unit that stores the specific transmission information in a memory of the subject transmission module in a manner where the plurality of pieces of specific information are arranged, with a storage location (storage address) of the specific information being associated with the priority level set by the priority level setting unit; a forming unit that extracts a portion of the plurality of pieces of specific information from the specific transmission information stored in the storage unit in accordance with the storage location, based on a result of transmission to the downstream transmission module and forms new specific transmission information to be transmitted to the downstream transmission module; and a transmitting unit that transmits the new specific transmission information formed by the forming unit to the downstream transmission module.

In the transmission module according to the present invention, the receiving unit receives the specific transmission information from the upstream transmission module, and the transmitting unit transmits the specific transmission information to the downstream transmission module whereby the transmission module functions as a relay in the predetermined transmission path serving as a network. The predetermined transmission path is formed by a transmission module serving as a relay located between a starting point and a terminating point of the transmission path. However, in the present invention, the predetermined transmission path is not intended to be limited to a specific path. That is, the predetermined transmission path may be a path determined in advance and may be a path which is determined by taking an information transmission environment into consideration when the transmission module having received information transmits the information to a downstream transmission module. Moreover, the transmission of information by the receiving unit and the transmitting unit may be performed wirelessly or by cables.

Here, the specific transmission information transmitted by the transmission module is information that is to be processed by the information processing device included in the predetermined transmission path. In the present invention, a configuration in which the specific transmission information is processed by the information processing device is not limited to a specific configuration. The specific transmission information includes a plurality of pieces of specific information. Preferably, the specific information solely by itself has a significant meaning. For example, when the type of information can be classified into a plurality of classes according to specific criteria, the specific information may be each piece of information classified by class or may be information belonging to a specific class and may be information (that is, old information or new information) classified according to the acquisition time. The plurality of pieces of specific information may be information that forms a portion of the specific transmission information in a broad sense.

Moreover, in the transmission module according to the present invention, the priority level setting unit sets the priority level in transmission to the downstream transmission module for the plurality of pieces of specific information included in the specific transmission information. That is, when the transmission result is not satisfactory, since it is considered that it is caused by a relatively large volume of the specific transmission information, the priority level to be extracted by the forming unit described later is set by the priority level setting unit in order to reduce the volume of the specific transmission information to improve the transmission result. The priority level setting unit may preferably set the priority level such that a higher priority level is set to specific information which is desirable to be transmitted immediately to the information processing device. As another method, in order to transmit information immediately and smoothly, a higher priority level may be set to specific transmission information such that the volume of the information to be transmitted decreases rather than the request on the information processing device side.

Moreover, the storage unit stores the specific transmission information to be transmitted by the transmitting unit. When the specific transmission information is stored in the storage unit, the transmission module can perform various processes on the specific transmission information such as transmitting the specific transmission information received by the receiving unit collectively at a timing or a plurality of timings appropriate to the subject transmission module. Here, the priority level set by the priority level setting unit is reflected on the process of the storage unit storing the specific transmission information in the memory. That is, the priority level is reflected in the stage in which the specific transmission information is stored in the memory by the storage unit, and a condition in which the specific transmission information is arranged, with the storage location of the specific information in the memory being associated with the priority level set by the priority level setting unit is created. When the specific information is stored in the memory in this manner, the storage locations of the respective pieces of specific transmission information indicate the priority levels thereof.

Based on the result of transmission to the downstream transmission module (that is, when transmission of information to the downstream transmission module is not performed satisfactorily), the forming unit performs a process of extracting a portion of the stored specific transmission information so as to decrease the volume of the specific transmission information to improve the information transmission. In this case, the respective pieces of specific information that form the specific transmission information are stored in the memory in a manner in which the storage location is associated with the priority level by the storage unit. Due to this, it is possible to eliminate a process of searching specific transmission information having a high priority level to be extracted during the extraction process and to reduce the processing load required for forming new specific transmission information after the extraction. Accordingly, it is possible to suppress the power consumption required for transmission of the specific transmission information. In particular, when specific transmission information is transmitted a plurality of times in a condition in which an unsatisfactory information transmission environment continues, it is significantly meaningful to suppress the power consumption required for forming new specific transmission information. The new specific transmission information formed in the subject transmission module is transmitted to the downstream transmission module by the transmitting unit.

In the transmission module described above, the storage unit may store in the memory as remaining information specific information other than the portion of specific information extracted to be included in the new specific transmission information by the forming unit, from among the plurality of pieces of specific information of the specific transmission information stored in the storage unit. With this configuration, the information remaining in the memory after some pieces of specific information are extracted by the forming unit is used as the remaining information. Since the remaining information is information that is originally to be transmitted to the information processing device, even if the priority level thereof is relatively low, it cannot be said that the remaining information is absolutely unnecessary for the information processing device. Thus, it is useful to store the remaining information so as to be prepared for later transmission to the information processing device as necessary.

In the transmission module, a portion or all pieces of the remaining information stored in the storage unit may be subjected to a compression process so that the volume of the remaining information decreases, and the compressed remaining information may be transmitted to the downstream transmission module after the new specific transmission information is transmitted by the transmitting unit. Since the remaining information has a relatively low priority level as compared to the information transmitted already as the specific transmission information, the remaining information may sometimes be information which is relatively less necessary on the information processing device side. In such a case, when the compression process is performed to reduce the volume of the remaining information and the compressed remaining information is transmitted to the information processing device, the information stored in the transmission module can be processed without worsening the transmission result. As an example of the remaining information compression process, when the specific information included as the remaining information is information related to a numerical value, the average value of a plurality of pieces of numerical data belonging to the specific information may be calculated.

The compressed remaining information may be transmitted after the new specific transmission information is transmitted a predetermined number of times by the transmitting unit. As another method, the compressed remaining information may be transmitted after a predetermined period has elapsed from a previous transmission time of the compressed remaining information. That is, the remaining information may be transmitted to the information processing device side at appropriate time by taking the amount of the remaining information stored in the subject transmission module into consideration while preferentially transmitting the new specific transmission information including the specific information having a high priority level. In general, since a memory has a limited storage capacity, when the remaining information is transmitted after being subjected to the compression process, it is possible to allow the information processing device to collect information as much as possible and to transmit the specific transmission information smoothly.

As still another method for transmitting the compressed remaining information, the compressed remaining information related to one of the plurality of pieces of specific information may be transmitted when a difference between a first predetermined value associated with the one specific information, which has already been transmitted from the subject transmission module to the downstream transmission module, and a second predetermined value associated with the one piece of specific information stored in the storage unit as the remaining information is equal to or larger than a predetermined threshold. When the difference between the first predetermined value associated with the one specific information transmitted to the information processing device and the second predetermined value associated with the one specific information remaining as the remaining information is relatively large, it can be considered that the one specific information as the remaining information which is considered as having a low priority level has a significant difference from the one specific transmission information which is considered as having a high priority level and has been transmitted already. Thus, when such remaining information is transmitted to the information processing device, it is possible to collect significant information.

Moreover, in the transmission module, the priority level setting unit may temporarily change the priority levels of the plurality of pieces of specific information. The priority levels of a plurality of pieces of specific information may change depending on the content of the processing in the information processing device. Thus, in order to cope with such a case, it may be useful to change the priority level in such a way that the priority level of specific information which was originally set to be low may be set to be high temporarily.

Here, in the transmission module described above, when a failure occurs in transmission of the specific transmission information to the downstream transmission module from the upstream transmission module received by the receiving unit, the forming unit may extract a portion of the plurality of pieces of specific information of the specific transmission information stored in the storage unit, based on a transmission failure result and form the new specific transmission information to be transmitted again to the downstream transmission module by the transmitting unit. That is, when transmission of the specific transmission information fails and a retry is performed, by forming the new specific transmission information, it is possible to immediately obviate a transmission failure resulting from the volume of the specific transmission information.

When the present invention is applied during such a retry, the forming unit may form the new specific transmission information to be transmitted again to the downstream transmission module so that the greater the number of failures in the transmission to the downstream transmission module becomes, the smaller the volume of the extracted specific information becomes. In this way, it is possible to obviate a transmission failure resulting from the volume of the specific transmission information more reliably while allowing a larger amount of specific transmission information to be transmitted to the information processing device.

Instead of applying the present invention during the retry after a transmission failure, another method may be used in the transmission module described above, when prediction is made that transmission of the specific transmission information to the downstream transmission module from the upstream transmission module received by the receiving unit would fail if the specific transmission information were transmitted, based on the result of past transmission from the subject transmission module to the downstream transmission module, the forming unit may extract a portion of the plurality of pieces of specific information of the specific transmission information stored in the storage unit, based on the predicted transmission failure result and form the new specific transmission information to be transmitted again to the downstream transmission module by the transmitting unit. When it is predicted that transmission of the specific transmission information will fail based on the past transmission result, the forming unit forms new specific transmission information having a small volume. In this way, it is possible to prevent a transmission failure in advance. Moreover, when it is possible to understand the probability of a transmission failure based on the past transmission result, the volume of the new specific transmission information (that is, how much specific information will be extracted) may be determined based on the transmission result. In this way, it is possible to transmit the specific transmission information more reliably while allowing a larger amount of specific transmission information to be transmitted to the information processing device.

Here, in the transmission module described above, the transmitting unit may consecutively transmit the new specific transmission information formed by the forming unit to the downstream transmission module a plurality of times. In such a transmission module that continuously transmits information, the amount of information flowing along the predetermined transmission path increases inevitably. Thus, when the present invention is applied, it is possible to suppress the occurrence of a transmission failure resulting from the volume of the specific transmission information as much as possible.

Moreover, the present invention can be understood from an aspect of a network system configured to transmit specific transmission information, which is information to be processed by an information processing device, via a plurality of transmission modules along a predetermined transmission path including the information processing device. In this case, at least one of the plurality of transmission modules includes: a receiving unit that receives information from an upstream transmission module located on an upstream side of a subject transmission module in the predetermined transmission path; a priority level setting unit that sets a priority level, which is to be transmitted to a downstream transmission module located on a downstream side of the subject transmission module in the predetermined transmission path, to a plurality of pieces of specific information included in the specific transmission information received by the receiving unit; a storage unit that stores the specific transmission information in a memory of the subject transmission module in a manner where the plurality of pieces of specific information are arranged, with a storage location of the specific information being associated with the priority level set by the priority level setting unit; a forming unit that extracts a portion of the plurality of pieces of specific information from the specific transmission information stored in the storage unit in accordance with the storage location, based on the result of transmission to the downstream transmission module and forms new specific transmission information to be transmitted to the downstream transmission module; and a transmitting unit that transmits the new specific transmission information formed by the forming unit to the downstream transmission module. The technical ideas disclosed in relation to the invention of the transmission module can be applied to the invention of the information transmission network system as long as there is no technical inconsistency.

Moreover, the present invention can be understood from an aspect of an information transmission method of transmitting specific transmission information to be processed by an information processing device along a predetermined transmission path including the information processing device via a transmission module that transmits information. In this case, the information transmission method includes: a receiving step of receiving information from an upstream transmission module located on an upstream side of a subject transmission module in the predetermined transmission path; a priority level setting step of setting a priority level, which is to be transmitted to a downstream transmission module located on a downstream side of the subject transmission module in the predetermined transmission path, to a plurality of pieces of specific information included in the specific transmission information received in the receiving step; a storing step of storing the specific transmission information in a memory of the subject transmission module in a manner where the plurality of pieces of specific information are arranged, with a storage location of the specific information being associated with the priority level set in the priority level setting step; a forming step of extracting portion of the plurality of pieces of specific information from the specific transmission information stored in the storage step in accordance with the storage location, based on a result of transmission to the downstream transmission module and forming new specific transmission information to be transmitted to the downstream transmission module; and a transmitting step of transmitting the new specific transmission information formed in the forming step to the downstream transmission module. The technical ideas disclosed in relation to the invention of the transmission module can be applied to the invention of the information transmission method as long as there is no technical inconsistency.

Moreover, the present invention can be understood from an aspect of an information transmission program for causing a transmission module that transmits specific transmission information to be processed by an information processing device along a predetermined transmission path including the information processing device to execute the following steps. In this case, the information transmission program causes the transmission module to execute: a receiving step of receiving information from an upstream transmission module located on an upstream side of a subject transmission module in the predetermined transmission path; a priority level setting step of setting a priority level, which is to be transmitted to a downstream transmission module located on a downstream side of the subject transmission module in the predetermined transmission path, to a plurality of pieces of specific information included in the specific transmission information received in the receiving step; a storing step of storing the specific transmission information in a memory of the subject transmission module in a manner where the plurality of pieces of specific information are arranged, with a storage location of the specific information being associated with the priority level set in the priority level setting step; a forming step of extracting a portion of the plurality of pieces of specific information from the specific transmission information stored in the storage step in accordance with the storage location, based on a result of transmission to the downstream transmission module and forming new specific transmission information to be transmitted to the downstream transmission module; and a transmitting step of transmitting the new specific transmission information formed in the forming step to the downstream transmission module. The technical ideas disclosed in relation to the invention of the transmission module can be applied to the invention of the information transmission program as long as there is no technical inconsistency.

Advantageous Effects of Invention

A transmission module as a relay capable of transmitting information smoothly and suppressing the power consumption required for the information transmission can be provided.

BRIEF DESCRIPTION OF DRAWINGS

FIGS. 5A and 5B are diagrams schematically illustrating a data structure of transmission information received from an upstream transmission module in the relay process illustrated in FIG. 4.

FIG. 6 is a diagram schematically illustrating a condition in which a transmission module stores temperature data and acceleration data included in the transmission information received from an upstream transmission module in a storage area of the module.

FIGS. 7A to 7C are diagrams illustrating a specific data content of transmission information when a transmission module transmits the transmission information to a downstream transmission module in the relay process illustrated in FIG. 4.

DESCRIPTION OF EMBODIMENTS

Hereinafter, a network system (hereinafter sometimes referred to simply as a "system") 10 according to the present invention and transmission modules 2 and 3 included in the system will be described with reference to the drawings. Configurations of embodiments described below are illustrative, and the present invention is not limited to the configurations of the embodiments.

Embodiment 1

Figure 1:
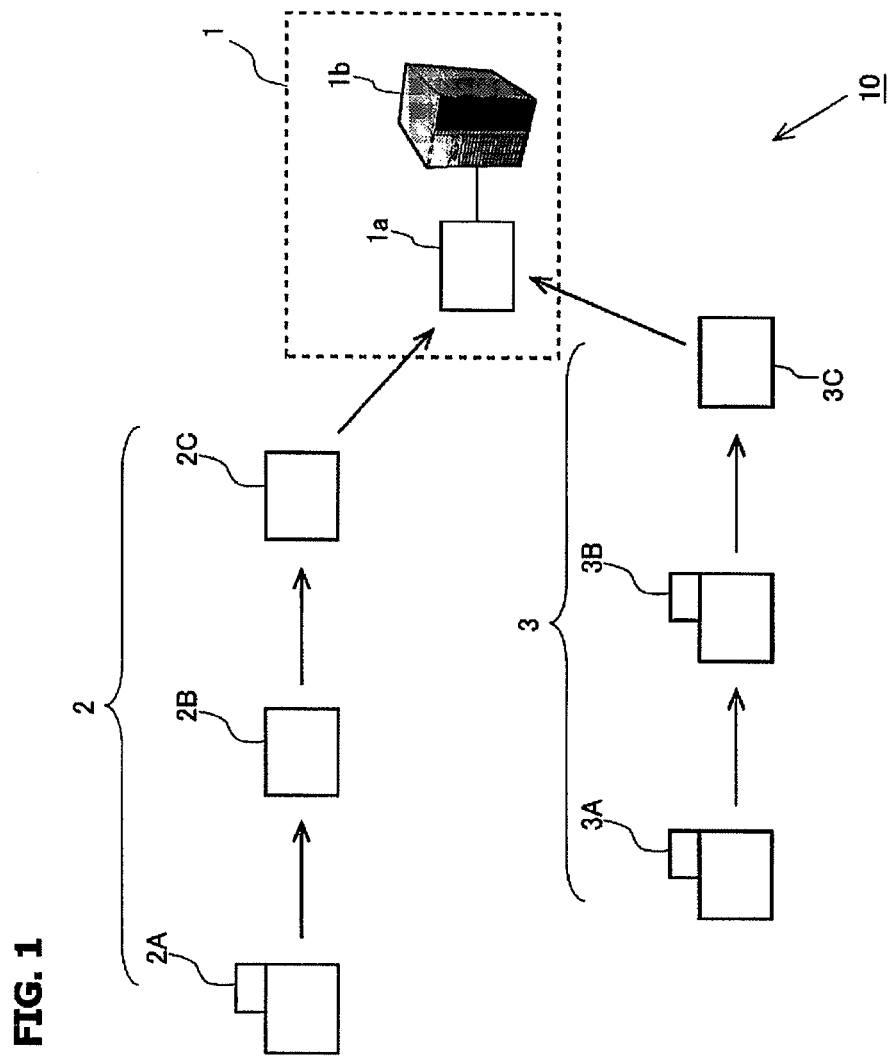
FIG. 1 is a diagram illustrating a schematic configuration of a network system according to the present invention.

FIG. 1 is a diagram illustrating a schematic configuration of the system 10. In the system 10, two transmission paths are formed between an information processing device 1 and transmission modules on which a sensor for measuring various external environmental parameters (temperature, humidity, acceleration, or the like) is mounted. A plurality of transmission modules included in one transmission path is denoted by the same reference numeral. Moreover, when the plurality of transmission modules of one transmission path are distinguished, characters ("A", "B," and the like) for identifying individual transmission modules are added following the reference numerals 2 and 3 of the transmission modules.

Specifically, a transmission path in which a plurality of transmission modules 2 is included and a transmission path in which a plurality of transmission modules 3 is included are formed in the system 10. A transmission module 2A having the sensor mounted thereon and transmission modules 2B and 2C having a relay function only and no sensor mounted thereon are included in the former transmission path. Transmission modules 3A and 3B having the sensor mounted thereon and a transmission module 3C having a relay function only and no sensor mounted thereon are included in the latter transmission path. In the system 10 illustrated in FIG. 1, communication between the transmission modules is performed wirelessly, and a relay sequence of transmission modules in each transmission path is determined in advance. Thus, for example, in the transmission path including the transmission modules 2, measurement data obtained by the sensor mounted on the transmission module 2A is transmitted in the order of transmission modules 2A, 2B, and 2C, and the measurement data is finally transmitted from the transmission module 2C to the information processing device 1 which is a destination of the path.

Here, the information processing device 1 includes a transceiving device 1a and a server 1b. The transceiving device 1a is a device for receiving information transmitted from the transmission modules 2C and 3C located closest to the information processing device 1 in each transmission path and transmitting a predetermined operation command to the transmission modules 2C and 3C located in each transmission path. The transceiving device 1a is electrically connected to the server 1b. The server 1b collects information measured by the sensor mounted on the transmission module 2A and the transmission modules 3A and 3B, for example, and performs predetermined information processing.

The measurement by the sensor mounted on the transmission module 2A and the transmission modules 3A and 3B and the transmission of the measurement data to the information processing device 1 are repeatedly executed at predetermined intervals (for example, fixed intervals) in order to execute information collection regularly after the respective transmission modules are turned on. Moreover, the transmission module on which the sensor is mounted among the transmission modules 2 and 3 illustrated in FIG. 1 is configured as a small device which implement functions such as a sensor function of measuring a measurement subject, a function of recording and processing the measured information, a wireless function of transmitting information to the outside of the transmission module, a power function, and the like The transmission module on which the sensor is not mounted is configured as a small device which implement functions such as a wireless function of transmitting information to the outside of the transmission module, a power function, and the like.

Examples of the sensor mounted on the transmission modules 2 and 3 include physical sensors such as a temperature sensor, a humidity sensor, an acceleration sensor, an illumination sensor, a flow sensor, a pressure sensor, a soil temperature sensor, and a particle sensor, and chemical sensors such as a $CO_2$ sensor, a pH sensor, an EC sensor, and a soil moisture sensor. In the present embodiment, to simplify the description, it is assumed that a temperature sensor for measuring an external temperature at the location of each transmission module 2 and an acceleration sensor are mounted. The temperature data and the acceleration data measured by the transmission modules 2A, 3A, and 3B are provided for predetermined information processing in the server 1b.

Here, in the system 10, when measurement is performed by the sensor, the measurement data is finally transmitted to the information processing device 1 as transmission information through the relay process by the plurality of transmission modules. However, when information is transmitted wirelessly and the volume of data to be transmitted is relatively large, if a transmission environment around a transmission module is not in an ideal condition (for example, the presence of radio interference from another wireless device outside a transmission path), the probability (hereinafter referred to as a "success rate") that transmission is performed satisfactorily tends to decrease due to reasons such as an increase in the time required for transmission of the entire data. In a network configured such that, if transmission of data between transmission modules fails, the data is transmitted again, it is less likely to succeed in transmission of the measurement data unless the transmission environment is improved. Moreover, the time required for finally completing the transmission of the measurement data increases.

Thus, in the system 10 according to the present invention, when transmission of measurement data does not succeed and the measurement data is transmitted again, a process (hereinafter referred to as a "relay process") of decreasing the volume of the measurement data to be transmitted according to predetermined criteria and then transmitting the measurement data again is performed. In this way, it is possible to suppress the occurrence of a transmission failure resulting from the volume of measurement data to be transmitted. Further, it is generally requested to suppress the power consumption required for a relay process of a transmission module regardless of how electric power is supplied to the transmission module. Thus, in the system 10 according to the present invention, a predetermined process is performed in relation to storage of measurement data so that the processing load on the transmission module decreases when the transmission module performs the relay process.

Figure 2:
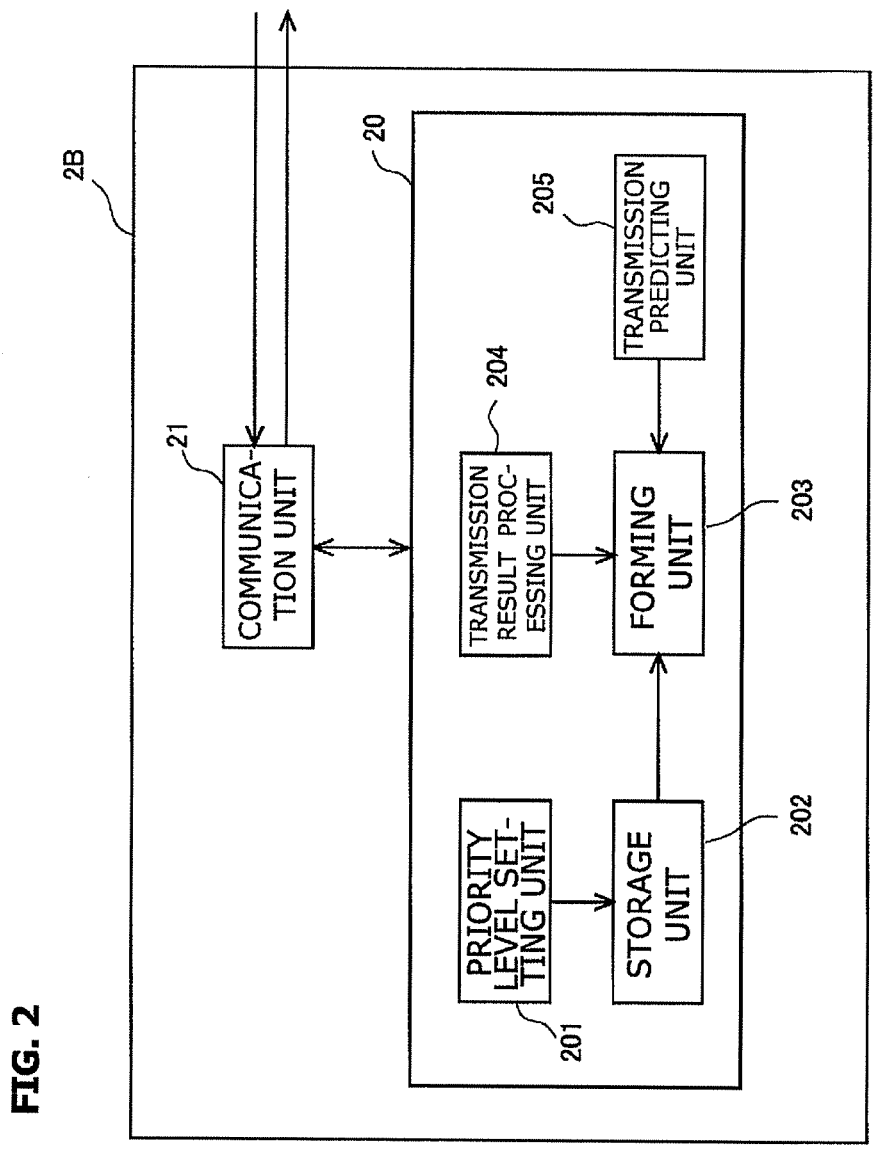
FIG. 2 is a functional block diagram of a transmission module included in the network system illustrated in FIG. 1.
Figure 3:
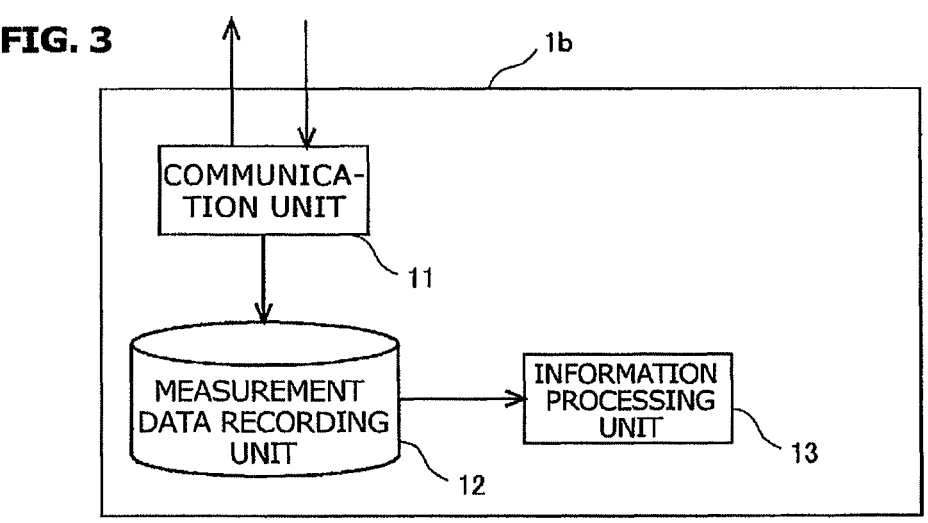
FIG. 3 is a functional block diagram of a server included in the network system illustrated in FIG. 1.

Based on the above, specific processes performed by the information processing device 1 and the transmission modules 2 and 3 of the system 10 will be described. The transmission modules 2 and 3 have an application program, a memory, and the like therein, and a predetermined control program is executed by the application program whereby various functions are realized. FIG. 2 illustrates functional blocks of some of the various functions performed by the transmission module 2 included in the system 10. Although FIG. 2 illustrates the specific functional blocks of the transmission module 2B on which no sensor is mounted, the transmission modules 2C and 3C without sensor have the same functions as the transmission module 2B. Moreover, the transmission modules 2A, 3A, and 3B having the sensor mounted thereon are configured to store the temperature data and the acceleration data detected by the temperature sensor and the acceleration sensor mounted thereon and transmit the detection information to a downstream transmission module with the aid of a communication unit, which is described later.

Here, the transmission module 2B has a control unit 20 and a communication unit 21 as functional units. The driving power of the transmission module 2B may be supplied from a battery included in the module and may be supplied from an AC power supply or the like outside the module. Hereinafter, the functional units included in the transmission module 2B will be described. The control unit 20 is a functional unit that controls various operations of the transmission module 2B, and particularly, includes a priority level setting unit 201, a storage unit 202, a forming unit 203, a transmission result processing unit 204, and a transmission predicting unit 205. The priority level setting unit 201 is a functional unit that sets a priority level of measurement data (hereinafter referred to simply as a "priority level") to be included in new transmission information formed by the forming unit 203 described later by taking the volume of the transmission information into consideration. The storage unit 202 is a functional unit that stores measurement data in the memory in the transmission module 2B according to the priority level set by the priority level setting unit 201. The forming unit 203 is a functional unit that forms new transmission information based on the priority level set by the priority level setting unit 201 so that the volume of the transmission information transmitted from the transmission module 2B to a downstream transmission module decreases. The transmission result processing unit 204 is a functional unit that performs processing on the transmission result of the transmission information from the transmission module 2B to the downstream transmission module. Examples of the processing on the transmission result include a process of determining whether transmission to the downstream transmission module has succeeded and a process of determining the causes of a transmission failure when the transmission failed. The transmission predicting unit 205 is a functional unit that predicts a transmission failure of the transmission information from the transmission module 2B to the downstream transmission module using, for example, the processing result of the transmission result processing unit 204.

The communication unit 21 is a functional unit that communicates with (that is, transmits and receives information to and from) the outside of the transmission module 2B. Specifically, the communication unit 21 is formed so as to interact with the control unit 20 and is configured to transmit and receive information between the transmission module 2B and the transmission module 2A corresponding to the upstream transmission module via a wireless network and transmit and receive information between the transmission module 2B and the transmission module 2C corresponding to a downstream transmission module. Since the transmission module 2B primarily functions as a relay, the transmission module 2B transmits the transmission information received from the transmission module 2A to the transmission module 2C to perform transmission of the transmission information. However, when new transmission information is formed by the forming unit, the transmission module 2B transmits the new transmission information formed by the forming unit 203 to the transmission module 2C rather than the transmission information itself received from the transmission module 2A.

Next, the functional units formed in the server 1b will be described. The server 1b includes a communication unit 11, a measurement data recording unit 12, and an information processing unit 13. The communication unit 11 is a functional unit that performs communication for collecting transmission information from a transmission module in the transmission path, located closest to the information processing device 1 via the transceiving device 1a. Specifically, the communication unit 11 performs transmission and reception of information between the transmission modules 2C and 3C and the information processing device 1. The measurement data recording unit 12 is a functional unit that records the temperature data and the acceleration data which are measurement data within the information included in the transmission information transmitted from the transmission modules 2C and 3C via the communication unit 11. The measurement data recorded in the measurement data recording unit 12 is delivered to the information processing unit 13, and the information processing unit 13 performs predetermined information processing (for example, a process of determining the strength of a structure in which a transmission module is placed) using the collected measurement data. Thus, the sensor mounted on the transmission module may be a sensor for measuring information required for the predetermined information processing that the information processing unit 13 is to perform.

Figure 4:
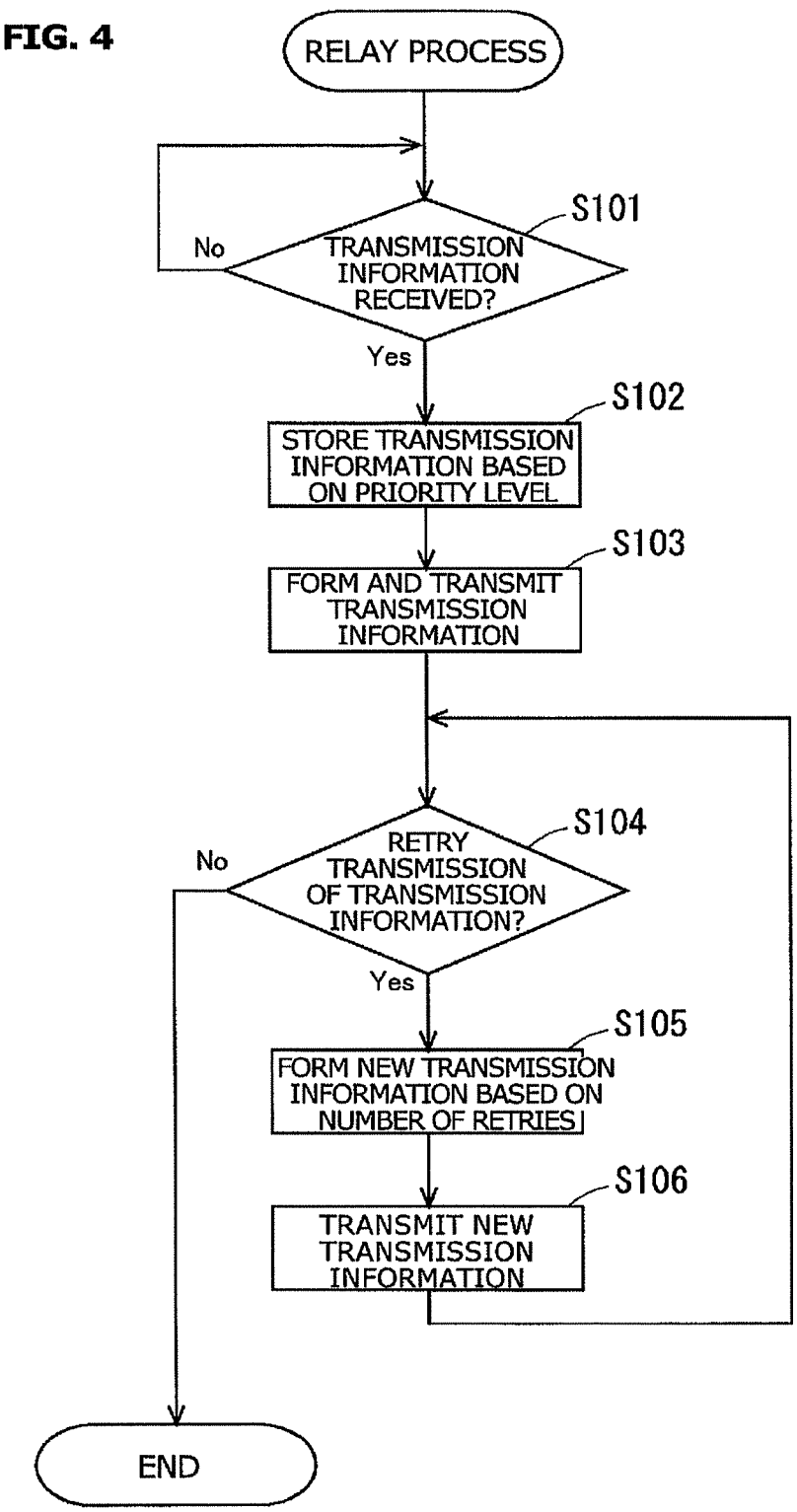
FIG. 4 is a flowchart of a transmission information relay process executed by the transmission module illustrated in FIG. 2.

Next, the relay process of the transmission module will be described based on FIG. 4. The relay process is a process realized when a predetermined control program is executed by the transmission modules 2B, 2C, 3B, and 3C that perform the relay process among the transmission modules 2 and 3 belonging to each of the two transmission paths illustrated in FIG. 1. Here, in the present embodiment, although the relay process of the transmission module 2B is described as a representative example, basically, the same relay process can be applied to the other transmission modules that perform the relay process.

FIGS. 5A and 5B illustrate a data structure of the transmission information transmitted by the transmission module 2B during the relay process. FIG. 5A schematically illustrates a data structure of entire transmission information and the transmission information is roughly divided into eight data areas. In the present embodiment, five data areas a1 to a5 which are particularly important among the eight data areas will be described. Area a1 (Start Symbol) is a specific byte sequence indicating the start of the transmission information. Area a2 (Destination Address) indicates the address of a destination (in the present embodiment, the information processing device 1) to which the transmission information is finally transmitted. Area a3 (Source Address) indicates the address of a source (in the present embodiment, the transmission module 2A) of the transmission information. Area a4 (Data) stores the temperature data and the acceleration data detected by the temperature sensor and the acceleration sensor mounted on the transmission module 2A which is the source. Area a5 (Terminator Symbol for Data) is a specific byte sequence indicating the end of the transmission information.

FIG. 5B illustrates a list of the temperature data and the acceleration data stored in Area a4. In the present embodiment, a measurement data group for three rounds of measurement, including the temperature data and the acceleration data measured by the temperature sensor and the acceleration sensor of the upstream transmission module 2A is stored in area a4. Specifically, temperature data T1 and acceleration data A1 acquired at time t10, temperature data T2 and acceleration data A2 acquired at time t20, and temperature data T3 and acceleration data A3 acquired at time t30 are stored in area a4 in ascending order of the data acquisition time. This is because the transmission module 2A is designed so as to transmit the measurement data for a plurality of rounds of measurement collectively rather than transmitting the measurement data to the transmission module 2B whenever data is measured by the temperature sensor and the acceleration sensor. Naturally, the form of the measurement data transmitted is not limited to the form illustrated in FIG. 55B.

<Relay Process>

Here, returning to FIG. 4, the relay process will be described. First, in S101, the subject transmission module 2B determines whether transmission information is received from the transmission module 2A located on the upstream side thereof. This determination is executed by the control unit 20 accessing the communication unit 21. The flow proceeds to S102 when a positive determination result is obtained in S101, and the process of S101 is performed again when a negative determination result is obtained.

Subsequently, in S102, the storage unit 202 stores the transmission information based on the priority level set by the priority level setting unit 201. Here, the priority level means the priority level of the measurement data set to be included in transmission information, when forming new transmission information described later by removing a portion of the measurement data included in the transmission information to facilitate transmission to the downstream transmission module 2C to decrease the data volume. Thus, the measurement data having a high priority level is preferentially included in the transmission information.

In the present embodiment, the priority level is set by taking the data required for the predetermined information processing performed by the information processing unit 13 of the server 1b into consideration. For example, when a process of determining the strength of a structure is performed as the predetermined information processing, the acceleration data which reflects the vibration applied to the structure may be considered to be more important than the temperature data. Moreover, among the same types of data, it is considered that new data acquired more recently is more important than data acquired before. In view of this, in the present embodiment, a higher priority level is set to the acceleration data than the temperature data, and a higher priority level is set to new data acquired more recently than data acquired before.

In S102, the storage unit 202 stores the transmission information in the memory in the transmission module 2B based on the priority level set in such manner that the location of the measurement data included in the transmission information is associated with the priority level. That is, as illustrated in FIG. 6, the measurement data having the highest priority level is stored in a start address at the head of an area allocated for storage of measurement data, in the memory of the transmission module 2B. Subsequently, measurement data having the second highest priority level is stored following the measurement data having the highest priority level. After that, other pieces of measurement data are sequentially stored in descending order of the priority level. Specifically, Data 6 which is the acceleration data of which the acquisition time is the newest is arranged in the start address, and Data 4, Data 2, Data 5, Data 3, and Data 1 are arranged in that order following Data 6. When the respective pieces of measurement data are arranged in this manner, a condition in which the locations (the addresses for specifying the data locations) reflect the priority levels set to the respective pieces of measurement data is created. When the process of S102 ends, the flow proceeds to S103.

Subsequently, in S103, transmission information in which all the pieces of measurement data stored in S102 are stored in Area a4 of the transmission information (that is, the same transmission information as the transmission information received from the upstream transmission module 2A) is formed and is transmitted to the downstream transmission module 2C via the communication unit 21. When the process of S103 ends, the flow proceeds to S104. In S104, the transmission result processing unit 204 determines whether the transmission of transmission information in S203 has failed and it is necessary to transmit the transmission information again (that is, it is necessary to retry the transmission). Specifically, the need of retry is determined based on the presence of an acknowledgement signal sent from a destination to which transmission information is transmitted. The flow proceeds to S105 when a positive determination result is obtained in S104 and this relay process ends when a negative determination result is obtained.

In S105, the forming unit 203 forms new transmission information. Specifically, when it is determined that a retry is required, it is considered that it is caused by a large volume of the transmission information. Thus, the number of pieces of measurement data included in Area a4 of the transmission information is decreased to reduce the volume of the transmission information to form new transmission information. Specifically, the pieces of measurement data arranged in the memory according to the priority level as illustrated in FIG. 6 are extracted in their arrangement order and are included in Area a4 of the transmission information to adjust the number of pieces of measurement data finally included in the transmission information to thereby reduce the volume of the transmission information.

Here, when transmission of transmission information fails repeatedly and it is necessary to retry transmission a plurality of times, it is considered that the volume of the transmission information is still large and the volume needs to be reduced further. Thus, in S105, the number of pieces of data extracted from the measurement data group arranged as illustrated in FIG. 6 is decreased so that the volume of the transmission information becomes smaller as the number of retries increases. For example, in the first retry, three pieces of data Data 6, Data 4, and Data 2 are extracted in descending order of the priority level and are included in Area a4 of the transmission information to form new transmission information of the present time. Moreover, in the second retry, Data 6 having the highest priority level only is extracted and included in Area a4 of the transmission information to form new transmission information of the present time. The new transmission information formed in this manner is transmitted to the downstream transmission module 2C via the communication unit 21 in S106.

As described above, according to the relay process of the present invention, when a failure occurs in transmission of transmission information and a retry is performed, some pieces of measurement data are extracted according to the priority level set based on the predetermined information processing performed by the server 1b, and these pieces of data are included in new transmission information which is transmitted again during the retry. In this way, it is possible to obviate a transmission failure of transmission information and to keep collecting data required for the information processing in the server 1b. Further, pieces of measurement data are stored in the memory of the transmission module 2B in the order corresponding to the priority level as illustrated in FIG. 6. Thus, it is not necessary to check the priority level of the measurement data in the memory whenever new transmission information is formed during the retry and the load on the transmission module 2B for forming the new transmission information can be reduced. By doing so, since it is possible to suppress the electric power required for the transmission process, the measurement data storage configuration is a significantly meaningful configuration.

FIGS. 7A to 7C illustrate a specific configuration of the transmission information transmitted from the transmission module 2B to the downstream transmission module 2C. The data areas in FIGS. 7A to 7C correspond to the data areas illustrated in FIGS. 5A and 5B. The transmission information illustrated in FIG. 7A is the transmission information transmitted by the process of S103 and includes Data 6, Data 4, Data 2, Data 5, Data 3, and Data 1 (corresponding to a41, a42, a43, a44, a45, and a46, respectively). Moreover, the transmission information illustrated in FIG. 7B is the transmission information transmitted in the first retry by the process of S106 and includes Data 6, Data 4, and Data 2 (corresponding to a41, a42, and a43, respectively). Further, the transmission information illustrated in FIG. 7C is the transmission information transmitted in the second retry by the process of S106 and includes Data 6 (a41) only.

The relation between the number of retries and the number of pieces of measurement data to be extracted may be determined in advance and may be changed depending on the condition of a transmission failure of transmission information. For example, when a transmission failure condition is determined based on reception signal strength (RSSI) between transmission modules, the relation between both numbers may be adjusted so that, when the transmission condition is not satisfactory and the reception signal strength is moderately weak, the degree of a decrease in the number of pieces of measurement data to be extracted when a plurality of retries was performed repeatedly is smaller than that when the reception signal strength decreases greatly.

In the transmission path in which the transmission module 3 illustrated in FIG. 1 is included, the transmission module 3B that performs the relay process is a type of relay that includes a temperature sensor and an acceleration sensor. Thus, when the transmission module 3B having both sensors performs the relay process, the measurement data measured by the transmission module 3B may be added to the transmission information received from the upstream transmission module 3A, and then, the process of storing the transmission information in the memory according to the priority level and the process of forming new transmission information may be performed. In this way, it is possible to collect a larger amount of measurement data by taking the transmission condition into consideration.

<Modification 1>

In the relay process illustrated in the embodiment, when transmission of transmission information is retried based on a transmission failure of the transmission information, the forming unit 203 forms new transmission information. Instead of such an embodiment, whether transmission of transmission information will fail may be predicted in advance, and when it is predicted that the transmission will fail, the forming unit 203 may form new transmission information without waiting for an actual transmission failure result. When the forming unit 203 forms the new transmission information after predicting the transmission failure, it is possible to reduce the processing load for transmission, of the transmission module 2B and to suppress the power consumption. The transmission failure is predicted by the transmission predicting unit 205 based on the processing result of the transmission result processing unit 204. Specifically, when the percentage of transmission failures of the transmission information transmitted to the downstream transmission module 2C in a predetermined number of times in the past is larger than a reference threshold, it can be predicted that a transmission failure will occur since it is highly likely that the transmission will fail again. Conversely, when the number of times the transmission information is received from the upstream transmission module 2A is smaller than a reference number of times (for example, an expected number of receptions) in a predetermined period, it is considered that it is difficult to receive the transmission information. Thus, it is also difficult to transmit the transmission information and it can be predicted that a transmission failure will occur. Moreover, the transmission failure of the transmission information may be predicted based on the RSSI of the transmission module 2B and information on, for example, the presence of a noise source or an obstacle present around the transmission module 2B.
<Modification 2>

In the relay process illustrated in the embodiment, although a retry is performed based on the presence of an acknowledgement signal, the transmission information may be transmitted without using the acknowledgement signal. In this case, since it is difficult to determine whether transmission of transmission information to a downstream transmission module has succeeded, the transmission information is transmitted continuously a plurality of times in order to increase the success rate of transmission as much as possible. The present invention can be applied to a transmission module that performs such continuous transmission. For example, when continuous transmission is performed a predetermined number of times, the present invention is not applied to the first transmission or a plurality of transmissions but the present invention is applied to the subsequent transmission (that is, transmission that is not based on the present invention and transmission that is based on the present invention are performed continuously). In this way, it is possible to improve the success rate of transmission and to suppress the power consumption of the transmission module.
<Modification 3>

In the embodiment, although the priority level setting unit 201 sets the priority level based on the type of measurement data and the acquisition time of the measurement data, the priority level may be set according to the following examples.

Example 1

When normal-condition measurement data and abnormal-condition measurement data are present in the same type of measurement data, the priority level of the abnormal-condition measurement data is set to be higher than that of the normal-condition measurement data. For example, when the predetermined information processing performed by the server 1b is a process of determining the strength of a structure, the measurement data that reflects an abnormal condition which affects the strength is to be collected preferentially. In such a case, abnormal data is preferentially extracted by the forming unit 203 and is included in new transmission information whereby the strength can be determined effectively. In order to determine whether measurement data is the abnormal-condition measurement data, a threshold serving as determination criteria may be set and whether measurement data is an abnormal value or not may be determined based on a comparison with the threshold.

Moreover, normal-condition measurement data of which the acquisition time is close to the abnormal-condition measurement data (that is, measurement data acquired immediately before and after the abnormal-condition measurement data was acquired) can be considered to be the normal-condition measurement data having relation with the abnormal condition. Thus, the same priority level as the abnormal-condition measurement data or a priority level higher than that of the normal-condition measurement data may be set to such normal-condition measurement data.

Example 2

Although the transmission module 2B illustrated in FIG. 1 receives transmission information from the upstream transmission module 2A, the system 10 may be configured so that the transmission module 2B receives transmission information from the other upstream transmission module. In this case, the transmission module 2B receives transmission information from a plurality of upstream transmission modules, and if a plurality of pieces of measurement data (for example, temperature data) are of the same type among the pieces of measurement data included in each transmission information has similar content, then a high priority level may be set to one of the plurality of pieces of measurement data and a low priority level may be set to the other pieces of measurement data. For example, when the server 1b collects information for performing a process of determining the strength of a structure, if a local temperature gradient is less likely to occur in a subject structure and acceleration data is generally more useful than temperature data in determining the strength of a structure, the strength of the structure can be determined relatively with high accuracy as long as a minimal number of pieces of representative temperature data only can be collected. Thus, in such a case, for temperature data, when a plurality of pieces of similar measurement data is present, by setting the priority level in such a manner, it is possible to collect information effectively while suppressing power consumption and to transmit information smoothly.

Example 3

As another example of the predetermined information processing performed by the server 1b, an energy consumption suppression process for air-conditioning control in a space such as a plant or a house may be performed. In this process, the amount of power consumption measured by a power sensor and temperature data measured by a temperature sensor are included as the measurement data included in the transmission information, and the air-conditioning in the space is controlled based on the amount of power consumption and the temperature. In the energy consumption suppression process, a higher priority level may be set to the power consumption data than the temperature data from the perspective of energy consumption.

Embodiment 2

Another embodiment of the transmission module according to the present invention will be described. As illustrated in the embodiment, the forming unit 203 forms new transmission information whereby the volume of the transmission information transmitted to the downstream transmission module 2C can be reduced. In this case, the measurement data which is not extracted as the new transmission information, and consequently, is not transmitted to the server 1b remains in the transmission module 2B as remaining information. For example, in a manner in which Data 1 to Data 6 are stored in the memory as illustrated in FIG. 6, when transmission of new transmission information formed by the first round of extraction succeeds, although the acceleration data of Data 6, Data 4, and Data 2 are transmitted, the temperature data of Data 5, Data 3, and Data 1 are not transmitted but remain in the memory as remaining information.

Figure 8:
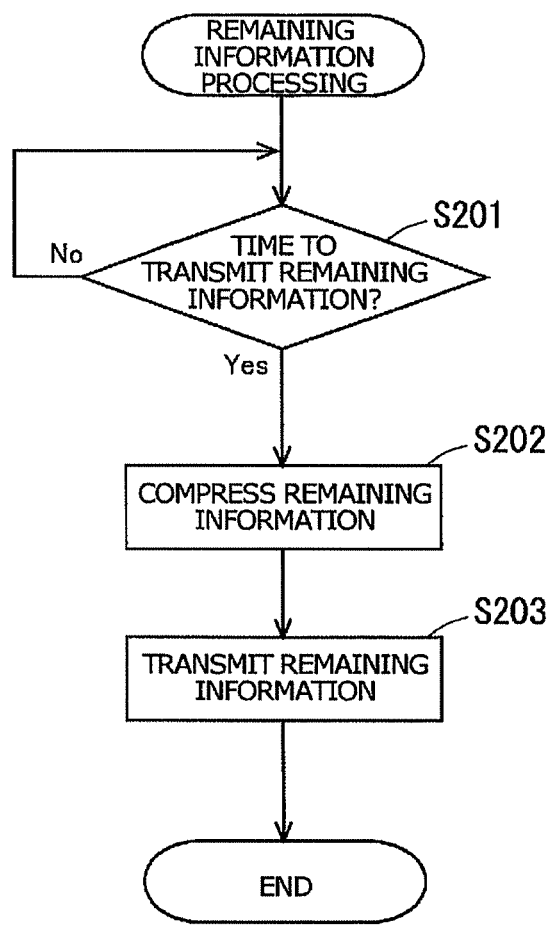
FIG. 8 is a flowchart of remaining information processing executed by the transmission module illustrated in FIG. 2.

Since such remaining information is originally measured to be transmitted to the server 1b and appended for the predetermined information processing, although a low priority level is set to the remaining information, it cannot be said that the remaining information is absolutely unnecessary information. In other words, when the server 1b acquires these pieces of remaining information or another information which reflects the content of the remaining information, the predetermined information processing may probably be performed more effectively. Thus, in the second embodiment, the processing on the remaining information remaining in the transmission module 2B when the relay process illustrated in FIG. 4 is performed will be described based on FIG. 8. The remaining information processing illustrated in FIG. 8 is a process realized when the transmission module (for example, the transmission module 2B) that performed the relay process illustrated in FIG. 4 executes a predetermined control program.

First, in S201, it is determined whether the time to transmit remaining information stored in the transmission module has come. For example, a case in which Data 5, Data 3, and Data 1 which are the temperature data as described above are not transmitted but remain as remaining information in the memory will be described. It is assumed that the transmission result processing unit 204 is configured to be able to detect the temperature data included in the transmission information transmitted to the downstream transmission module 2C in a predetermined past period. Moreover, an average value of the transmitted temperature data and an average value of the temperature data of Data 5, Data 3, and Data 1 remaining presently as the remaining information are compared and it is determined that the time to transmit remaining information has come when a difference between both average values is equal to or larger than a predetermined threshold. This is because an increase in the difference between both average values is considered to reflect a temperature condition different from the temperature data transmitted already, and such remaining information is considered to be useful for the predetermined information processing in the server 1b.

As another method, it may be determined that the time to transmit remaining information has come when the new transmission information formed by the forming unit 203 has been transmitted a predetermined number of times. As still another method, it may be determined that the time to transmit remaining information has come when a predetermined period has elapsed from the previous transmission time of the remaining information. In these cases, the reason why the remaining information is transmitted is because a relatively large amount of remaining information is stored in the memory of the transmission module 2B.

Figure 9:
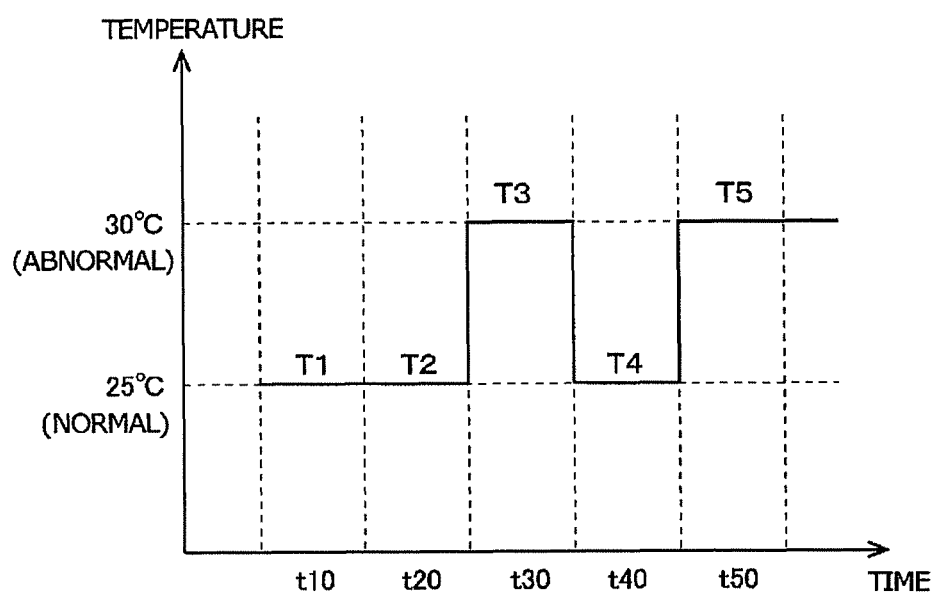
FIG. 9 is a diagram for describing a remaining information compression process in the remaining information process illustrated in FIG. 8.

Subsequently, in S202, the remaining information to be transmitted is compressed. This remaining information compression process is performed on the remaining information that can be compressed, and the compression process will be described based on FIG. 9. FIG. 9 illustrates a correlation between the acquisition time of the temperature data remaining in the transmission module 2B as remaining information in the relay process illustrated in FIG. 4 and the temperature at that time among the pieces of temperature data acquired by the transmission module 2A. In FIG. 9, temperature data T4 acquired at time t40 and temperature data T5 acquired at time T50 which are not illustrated in FIGS. 5A and 5B and FIG. 6 are added for the sake of convenience.

Here, the temperature data T1 and T2 is regarded as normal-condition measurement data. As described above, when the importance of normal data of the temperature data is not so high in the process of determining the strength of a structure, the number of pieces of temperature data can be reduced by averaging of the temperature data T1 and temperature data T2, and the averaging corresponds to the compression process. On the other hand, since the temperature data T3 and T5 is the abnormal-condition measurement data, these pieces of temperature data can be considered to be relatively useful for the process of determining the strength of a structure. Thus, these pieces of data are not subjected to a special compression process and are included in the remaining information to be transmitted as they are. Moreover, the temperature data T4 of which the acquisition time occurs between the acquisition time points of the temperature data T3 and the temperature data T5. However, since another successive normal condition temperature data is not present, the temperature data T4 is not subjected to the averaging-based compression process but is included in the remaining information to be transmitted as it is. The compression process is an example only, and how compression target data is selected and compressed may be adjusted appropriately based on the importance or the like of the measurement data included in the remaining information.

When the process of S202 ends, the flow proceeds to S203, and the remaining information is transmitted from the transmission module 2B to the downstream transmission module 2C toward the server 1b. As described above, according to the remaining information processing according to the present embodiment, measurement data which was regarded as having a low priority level and was not extracted by the forming unit 203 is transmitted to the server 1b at an appropriate timing and is subjected to the compression process at that time. Thus, it is possible to collect information effectively without any excessive load on the network of the system 10.

<Modification>

In this modification, the priority level set by the priority level setting unit 201 may be changed temporarily. For example, when it is necessary to collect temperature data more preferentially than acceleration data temporarily depending on the content of the predetermined information processing performed by the server 1b, the priority level setting unit 201 of the transmission module 2B temporarily performs a process of increasing the priority level of the temperature data to be higher than that of the acceleration data according to a command from the server 1b. In this way, the storage unit 202 stores the measurement data at a storage location (storage address) which reflects the priority level of the temperature data.

REFERENCE SIGNS LIST

1 Information processing device
1b Server
2, 2A, 2B, 2C, 3, 3A, 3B, 3C Transmission module
Network system

The invention claimed is:

1. A transmission module that transmits specific transmission information to be processed by an information processing device along a predetermined transmission path including the information processing device, the transmission module comprising:
  a processor; and
  a non-transitory computer-readable medium storing a computer program that, when executed by the processor, causes the processor to function as:
    a receiving unit that receives information from an upstream transmission module located on an upstream side of a subject transmission module in the predetermined transmission path;
    a priority level setting unit that sets a priority level in transmission to a downstream transmission module located on a downstream side of the subject transmission module in the predetermined transmission path, for a plurality of pieces of specific information included in the specific transmission information received by the receiving unit;

a storage unit that stores the specific transmission information in a memory of the subject transmission module in a manner where the plurality of pieces of specific information are arranged, with a storage location of the specific information being associated with the priority level set by the priority level setting unit;

a forming unit that extracts a portion of the plurality of pieces of specific information from the specific transmission information stored in the storage unit in accordance with the storage location, based on a result of transmission to the downstream transmission module and forms new specific transmission information to be transmitted to the downstream transmission module; and a transmitting unit that transmits the new specific transmission information formed by the forming unit to the downstream transmission module, wherein the forming unit forms the new specific transmission information when the transmission to the downstream transmission module fails, and the portion of the plurality of pieces of specific information included in the new specific transmission information is determined according to a number of times that the transmission to the downstream transmission module fails.

2. The transmission module according to claim 1, wherein the storage unit stores in the memory as remaining information specific information other than the portion of specific information extracted to be included in the new specific transmission information by the forming unit, from among the plurality of pieces of specific information of the specific transmission information stored in the storage unit.

3. The transmission module according to claim 2, wherein a portion or all pieces of the remaining information stored in the storage unit are subjected to a predetermined compression process so that the volume of the remaining information decreases, and the compressed remaining information is transmitted to the downstream transmission module after the new specific transmission information is transmitted by the transmitting unit.

4. The transmission module according to claim 3, wherein the compressed remaining information is transmitted after the new specific transmission information is transmitted a predetermined number of times by the transmitting unit.

5. The transmission module according to claim 3, wherein the compressed remaining information is transmitted after a predetermined period has elapsed from a previous transmission time of the compressed remaining information.

6. The transmission module according to claim 3, wherein the compressed remaining information related to one of the plurality of pieces of specific information is transmitted when a difference between a first predetermined value associated with the one specific information, which has already been transmitted from the subject transmission module to the downstream transmission module, and a second predetermined value associated with the one piece of specific information stored in the storage unit as the remaining information is equal to or larger than a predetermined threshold.

7. The transmission module according to claim 2, wherein the priority level setting unit temporarily changes the priority levels of the plurality of pieces of specific information.

8. The transmission module according to claim 1, wherein when a failure occurs in transmission of the specific transmission information to the downstream transmission module from the upstream transmission module received by the receiving unit, the forming unit extracts a portion of the plurality of pieces of specific information of the specific transmission information stored in the storage unit, based on a transmission failure result and forms the new specific transmission information to be transmitted again to the downstream transmission module by the transmitting unit.

9. The transmission module according to claim 8, wherein the forming unit forms the new specific transmission information to be transmitted again to the downstream transmission module so that the greater the number of failures in the transmission to the downstream transmission module becomes, the smaller the volume of the extracted specific information becomes.

10. The transmission module according to claim 1, wherein when prediction is made that transmission of the specific transmission information to the downstream transmission module from the upstream transmission module received by the receiving unit would fail if the specific transmission information were transmitted, based on the result of past transmission from the subject transmission module to the downstream transmission module, the forming unit extracts a portion of the plurality of pieces of specific information of the specific transmission information stored in the storage unit, based on the predicted transmission failure result and forms the new specific transmission information to be transmitted again to the downstream transmission module by the transmitting unit.

11. The transmission module according to claim 1, wherein the transmitting unit consecutively transmits the new specific transmission information formed by the forming unit to the downstream transmission module a plurality of times.

12. A network system configured to transmit specific transmission information, which is information to be processed by an information processing device, via a plurality of transmission modules along a predetermined transmission path including the information processing device, wherein at least one of the plurality of transmission modules comprises:

a processor; and a non-transitory computer-readable medium storing a computer program that, when executed by the processor, causes the processor to function as:

a receiving unit that receives information from an upstream transmission module located on an upstream side of a subject transmission module in the predetermined transmission path;

a priority level setting unit that sets a priority level in transmission to a downstream transmission module located on a downstream side of the subject transmission module in the predetermined transmission path, for a plurality of pieces of specific information included in the specific transmission information received by the receiving unit;

a storage unit that stores the specific transmission information in a memory of the subject transmission module in a manner where the plurality of pieces of specific information are arranged, with a storage location of the specific information being associated with the priority level set by the priority level setting unit;

a forming unit that extracts a portion of the plurality of pieces of specific information from the specific transmission information stored in the storage unit in accordance with the storage location, based on a result of transmission to the downstream transmission module and forms new specific transmission information to be transmitted to the downstream transmission module; and a transmitting unit that transmits the new specific transmission information formed by the forming unit to the downstream transmission module, wherein the forming unit forms the new specific transmission information when the transmission to the downstream transmission module fails, and the portion of the plurality of pieces of specific information included in the new specific transmission information is determined according to a number of times that the transmission to the downstream transmission module fails.

13. An information transmission method of transmitting specific transmission information to be processed by an information processing device along a predetermined transmission path including the information processing device via a transmission module that transmits information, the information transmission method comprising:

a receiving step of receiving information from an upstream transmission module located on an upstream side of a subject transmission module in the predetermined transmission path;

a priority level setting step of setting a priority level in transmission to a downstream transmission module located on a downstream side of the subject transmission module in the predetermined transmission path, for a plurality of pieces of specific information included in the specific transmission information received in the receiving step;

a storing step of storing the specific transmission information in a memory of the subject transmission module in a manner where the plurality of pieces of specific information are arranged, with a storage location of the specific information being associated with the priority level set in the priority level setting step;

a forming step of extracting a portion of the plurality of pieces of specific information from the specific transmission information stored in the storage step in accordance with the storage location, based on a result of transmission to the downstream transmission module and forming new specific transmission information to be transmitted to the downstream transmission module; and a transmitting step of transmitting the new specific transmission information formed in the forming step to the downstream transmission module, wherein the forming step further comprises forming the new specific transmission information when the transmission to the downstream transmission module fails, and determining the portion of the plurality of pieces of specific information included in the new specific transmission information according to a number of times that the transmission to the downstream transmission module fails.

14. A non-transitory computer-readable medium storing an information transmission program for causing a transmission module that transmits specific transmission information to be processed by an information processing device along a predetermined transmission path including the information processing device to execute:

a receiving step of receiving information from an upstream transmission module located on an upstream side of a subject transmission module in the predetermined transmission path;

a priority level setting step of setting a priority level in transmission to a downstream transmission module located on a downstream side of the subject transmission module in the predetermined transmission path, to a plurality of pieces of specific information included in the specific transmission information received in the receiving step;

a storing step of storing the specific transmission information in a memory of the subject transmission module in a manner where the plurality of pieces of specific information are arranged, with a storage location of the specific information being associated with the priority level set in the priority level setting step;

a forming step of extracting a portion of the plurality of pieces of specific information from the specific transmission information stored in the storage step in accordance with the storage location, based on a result of transmission to the downstream transmission module and forming new specific transmission information to be transmitted to the downstream transmission module; and a transmitting step of transmitting the new specific transmission information formed in the forming step to the downstream transmission module, wherein the forming step further comprises forming the new specific transmission information when the transmission to the downstream transmission module fails, and determining the portion of the plurality of pieces of specific information included in the new specific transmission information according to a number of times that the transmission to the downstream transmission module fails.

* * * * *